United States Patent Office 3,426,971
Patented Feb. 11, 1969

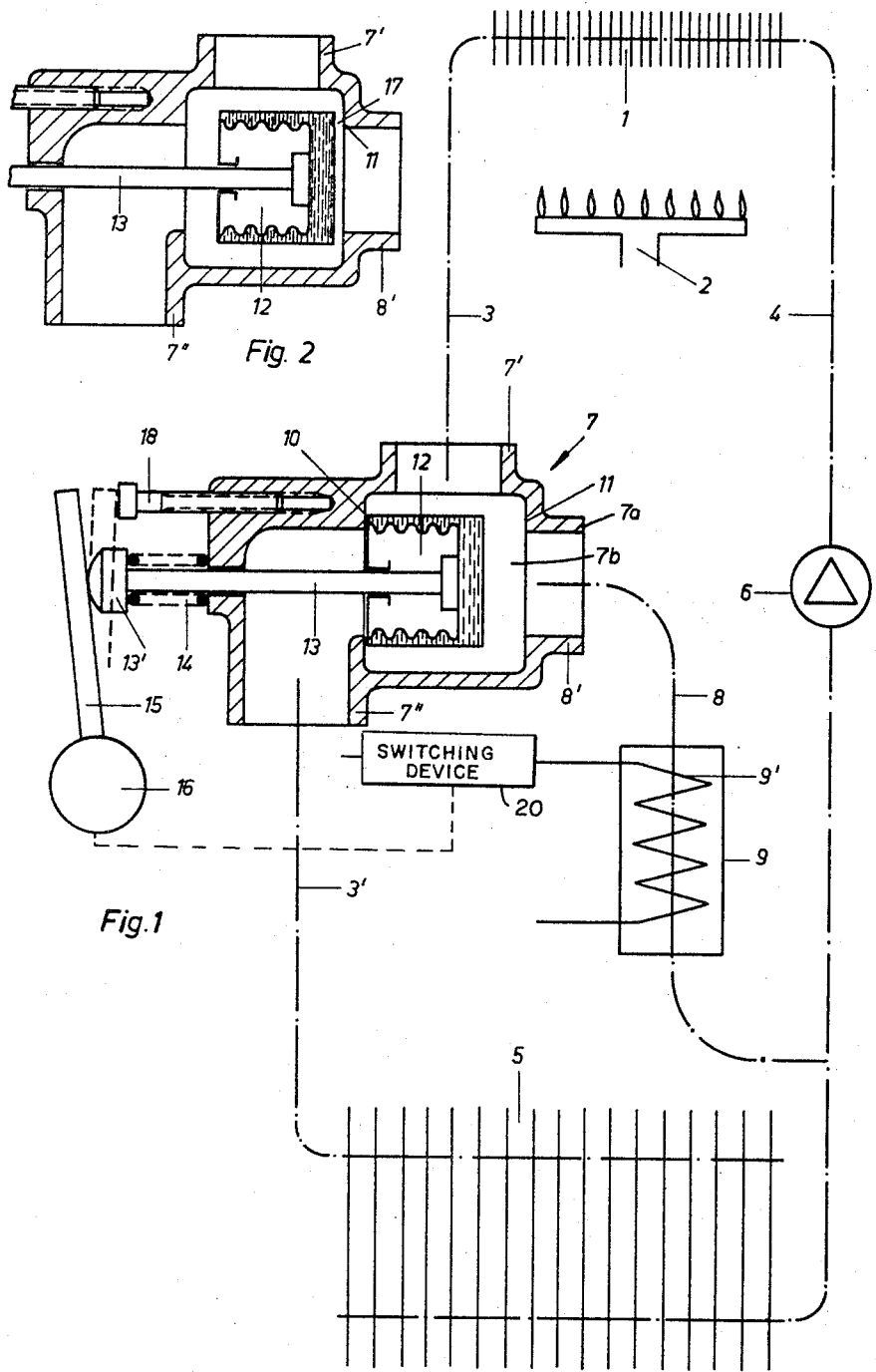

3,426,971
ARRANGEMENT IN A HOT-WATER CIRCULATION
HEATING WITH DOMESTIC WATER HEATER
Hans Meier, Remscheid, Germany, assignor to Joh
Vaillant KG, Remscheid, Germany
Filed Nov. 7, 1966, Ser. No. 592,380
Claims priority, application Germany, Nov. 22, 1965,
V 29,774; May 14, 1966, V 31,062
U.S. Cl. 237—8
Int. Cl. F24d *3/08;* F28f *27/00*
6 Claims

ABSTRACT OF THE DISCLOSURE

A system for heating hot water radiators and a domestic hot water supply formed by a heat exchanger is provided with a thermostatically controlled valve to regulate the flow in the supply line leading from the water heater to the radiators and to the heat exchanger. This valve has two opposed valve seats, one about the line leading to the heat exchanger and the other the line leading to the radiator. A valve closure member is positioned between these seats to cooperate with one or the other of the seats in closing off the flow therethrough. In one embodiment the valve closure is motor actuated from a position closing off the line leading to the radiator to a position at which it is spaced from that valve seat. This motor is actuated to move the closure to the displaced position when the heating system is in operation and no domestic water is being drawn through the heat exchanger. This closure member is an expansible bellows and, when in the displaced position and the circulating water from the heater raises to a given temperature, the bellows expands so as to move the valve closure toward the seat about the line leading to the exchanger thereby to shut down the flow of water through the heat exchanger and to diminish the bypass effected thereby across the radiator. In a second embodiment the valve closure is moved between the valve seats by a heat sensor positioned to be actuated by the water coming to the valve from the heater. The cold water domestic supply for the exchanger runs through a loop about this heat sensor to more strongly affect the operation of the sensor by that cold water temperature than it is influenced by the temperature of the water from the heater. When domestic water is drawn, the cold water causes the closure to move toward the valve seat through which the water to the radiator passes so as to divert water from the heater through the heat exchanger. When cold water is not being drawn the hot water from the heater causes the sensor to move the closure member toward the valve seat controlling the flow through the heat exchanger.

---

The present invention relates to an arrangement in a hot-water circulation heating comprising a heat exchanger for domestic water heating in by-pass to the heating circuit between supply and return flow lines. In systems of the type indicated it is known to provide a preferably automatically acting change-over device which permits the connection of the supply line to the by-pass, when domestic water is drawn or, for heating operation, to the heating circuit. Such a change-over device frequently referred to as a priority switch provides for the totally produced heat amount to be available for domestic water heating when domestic water is drawn and not to be partly transmitted in the heating circuit.

On the other hand, in the hot-water circulation line it is known to temporarily establish a short-circuit by means of a thermostatically controlled valve by-passing the heating circuit, between the supply and return flow lines, and to return a portion of the hot water directly into the return flow line, so as to cause the supply water to more quickly assume higher temperatures. This short-circuit is interrupted by a thermostat valve as soon as a sufficiently high temperature is attached in the supply line between the heat exchanger and the radiator of the heating system. Hitherto, in hot-water circulation systems, in addition to using a priority change-over device, frequently a second control element designed as thermostat valve has been used to permit a quick heating up of the supply water by the control of a short-circuit connection.

As compared therewith, the present invention resides in the fact that the priority change-over device is designed as thermostat valve which permits a portion of the supply water to pass to the return flow line via the by-pass, in response to the supply or return flow temperature, when the heating circuit is connected. In this manner, an additional thermostat valve is obviated since the priority change-over device assumes the function thereof, the short-circuit connection being represented by the heat exchanger of the domestic water heater. This results in the further advantage that upon a cold start of the system the heat exchanger of the domestic water heater is pre-heated so that after a relatively short period of time heated domestic water is ready to be tapped.

The invention is conveniently realized in that the closing body of the change-over device is held in a defined position in front of the valve seat belonging to the bypass, by a stop, and that the closing body is designed as temperature sensitive expansion body.

The invention may, however, also be particularly advantageously realized in that the heat sensor of the thermostat valve apart from being subjected to the supply or return flow temperature is also subjected to the cold water temperature in the domestic water supply line, the influence of which is selected greater than the influence of the supply or return flow temperature. Thus, the heat sensor of the priority change-over device is on the one hand, under a strong influence of the cold water which flows in when domestic water is being tapped, in order to fulfill the one function. On the other hand, the heat sensor is under a weaker influence of the water in the supply or return flow line, heated by the heat source, in order to fulfill the second function.

Expediently this is attained in that the heat sensor of the thermostat valve is surrounded by a pipe loop of the cold water supply line of the domestic heater internally of a chamber traversed by the supply or return flow water. Therefore, with such an arrangement, when domestic water is being tapped, there need be no mechanical or electromagnetic actuation of the priority change-over switch, but the change-over is effected thermostatically by the cold water influence when domestic water is being tapped.

Two embodiments of the present invention are presented with reference to the partly schematical drawings and are described as follows:

FIG. 1 illustrates schematically one embodied form comprising a priority switch which can be changed over electromagnetically.

FIG. 2 illustrates the priority switch positioned for hot water circulation.

Figure 3:
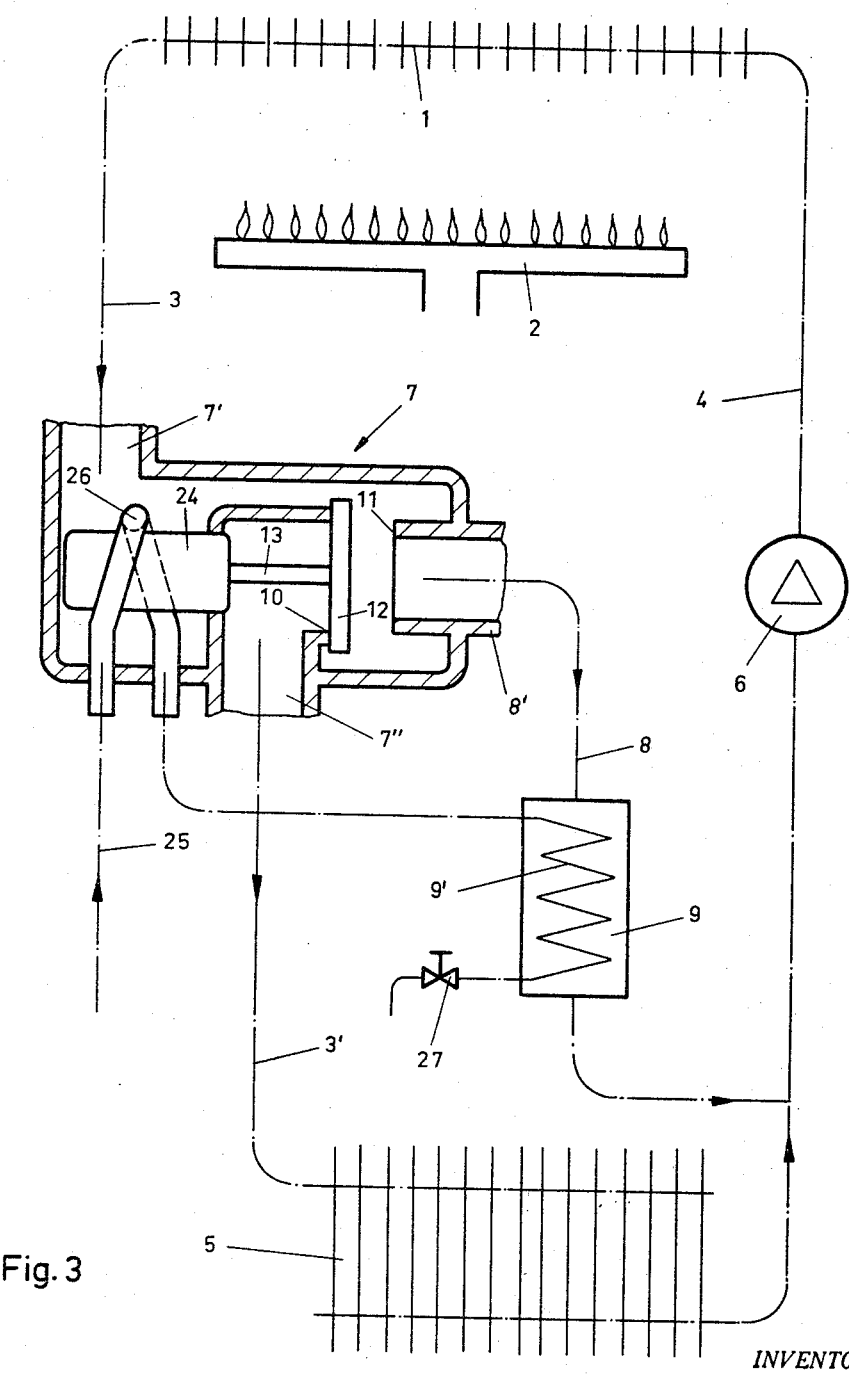
FIG. 3 is a schematic representation of an embodied form comprising a priority switch which can be changed over thermostatically.

In all figures reference numeral 1 designates the heat exchanger of a continuous-flow heater to which heat is supplied by a gas burner 2. The heat exchanger 1 has connected thereto a heating circuit containing radiators 5, by a supply line 3 and a return flow line 4. A circulating pump 6 is connected into the return flow line 4. The supply line 3 is connected with an inlet socket or connection 7' of a priority change-over device or valve 7. Changeover device 7 includes a valve body 7a with an internal opening 7b. An outlet socket or connection 7'' has connected thereto the branch 3' of the supply line, leading to the radiators 5. A socket or connection 8' of the priority change-over device 7 serves for the connection of a connecting line 8 leading to the return flow line 4, and having a heat exchanger 9 connected therein. The heat exchanger 9 contains a coil of pipe 9' in which the domestic water is heated.

Between the connecting sockets 7', 7'' a valve seat 10 is provided in the priority change-over device 7 A further valve seat 11 which closes off the connecting socket 8' is arranged opposite to the valve seat 10. Between the valve seats 10 and 11 a valve closing body or closure 12 is positioned and is guided by a valve stem 13. In the embodied form as shown in FIGS. 1 and 2 the valve closing body 12 is designed as temperature sensitive expansion body. By a valve spring 14 supporting against the head 13' of the valve stem 13, the valve closing body 12 is urged toward the valve seat 10. The head 13' has acting thereon the final control element 15 of a geared motor 16. An abutment on an adjusting screw 18 serves as a stop for control element 15 and thus closure 12. When the geared motor 16 is energized the final control element 15 pushes the valve closing body 12 from the valve seat 10 against the action of the valve spring 14, and forces the same into a position determined by the stop of the adjusting screw 18, illustrated in FIG. 2. In this displaced position, a free annular gap 17 still remains between the valve seat 11 and the valve closing body 12.

In normal operation of the hot-water circulation heating the geared motor 16 is energized and consequently, the valve closing body 12 is in the position as illustrated in FIG. 2. In this position there is an open passage through the valve between connections 3 and 3' so that the circulating pump 6 can feed the water heated in the heat exchanger 1 through the supply line 3, 3' through the radiators 5 and the return flow line 4. However, a portion of the heated supply water flows via the annular gap 17 through the connecting line 8 and the heat exchanger 9 directly towards the return flow line 4 in which it is mixed with the return flow water and subsequently flows into the heat exchanger 1 for re-heating. The heat exchanger 9 is pre-heated by this partial stream and due to the shortened circulation path of this partial stream the supply temperature is increased rather rapidly. As the supply temperature becomes higher, the valve closing body 12 expands to an increasing extent and reduces the flow through the annular gap 17. When the setpoint temperature of the supply water is attained the valve closing body 12 has expanded so much that it contacts the valve seat 11 and closes off the annular gap 17.

When domestic water is being tapped from the coil of pipe 9', a switching device 20 starts operating which switches off the geared motor 16. Therefore, under the influence of the valve spring 14 the valve closing body 12 is caused to assume the position as illustrated in FIG. 1 and the branch 3' of the supply line, leading to the heating circuit is closed off and the flow to the connecting line 8 is released instead. Thereby, the domestic water heating in the heat exchanger 9 gets priority over the heating circuit which remains disconnected during the domestic water draw.

In the embodied form as illustrated in FIG. 3 the valve stem 13 is connected with a heat sensor 24 which, internally of the priority change-over device 7, is under the influence of the temperature of the water entering into the socket 7' from the supply line 3. The cold water supply from a line 25 to the coil of pipe 9' of the domestic water heater 9 is carried through a pipe loop 26 of the priority change-over device 7, which loop closely surrounds the heat sensor 24. Reference numeral 27 designates a tap valve for drawing domestic water.

When the circulating pump 6 is started in cold state and the burner 2 is ignited, cold water first flows from the heat exchanger 9 into the return flow line 4. The heating circuit containing the radiators 5 is therefore short-circuited at first, the valve being in the FIG. 3 position. On the described short-circuit path via 8 and 9 the water is heated relatively quickly. As the water temperature increases, this is detected by the heat sensor 24 which moves the valve closing body 12 from its seat 10 so that an increasing amount of water is permitted to pass into the heating circuit and the radiators 5 via the branch 3'. When the operating temperature of the hot water circulation heating is reached, the valve closing body 12 closes off the valve seat 11 under the influence of the heat sensor 24 so that no circulation water is allowed to pass into the return flow line 4 via the short-circuit connection 8, 9 but all water must flow through the radiators 5. This function of the priority change-over device results in the fact that at first without heat emission in the radiators 5 a sufficient operating temperature of the circulation heating can be established as quickly as possible, and that also a possibly quick heat storage in the domestic water heater 9 is effected.

When, in the operating state of the circulation hot-water heating (as previously described) and the valve seat 11 is closed off, the tap valve 27 is opened to tap domestic water, it is desired that about all of the heat produced by the burner 2 can be utilized for the domestic water heating and to this end, the short-circuit of the heating circuit 3', 5 be reestablished via line 8 and the heat exchanger 9. This is accomplished in that the cold water following through the pipe loop 26 from line 25 strongly cools off the heated heat sensor 24 and overrides the influences of the hot water coming from the supply line 3. The influence of the cold water in the pipe loop 26 is selected so strong that the heat sensor 24 causes the valve closure 12 to relatively quickly move from valve seat 11 to valve seat 10 closing off the heating line 3'. Closure 12 maintains this position even though the now heated water from the heat exchanger 1 flows through the priority change-over device 7, line 8 and the domestic water heater 9. Thus, due to the predominant influences of the flowing cold water in the pipe loop 26 on the heat sensor 24, the domestic water heating obtains a priority over the feeding of the heating circuit 3', 5, without a mechanical or electromagnetical change-over of the valve closing body 12 having to be effected. However, the priority change-over device 7 also fulfills the function of a circulation water control whereby the circulation in the heating circuit 3', 5 is interrupted or weakened as long as the operating temperature is not yet reached.

The invention is claimed as follows:

1. In a hot water heating apparatus having supply and return lines between a water heater and a heat utilization element and a bypass across said lines and through a heat exchanger for a domestic water heating system from a cold water supply and with a priority change-over valve means connected between said heater and said element and connected to said bypass to selectively control the flow from the supply line to said element or to said exchanger, the improvement comprising:

said valve means including a valve body having a heater connection, an element connection, a first valve seat associated with the element connection, an exchanger connection, and a second valve seat associated with the exchanger connection, said body defining an internal opening extending through said valve seats and communicating with said connection;

valve closure means in said opening and operatively associated with said seats to control the flow of water therethrough, said closure means being movable with respect to said valve seats to control the water flow therethrough; and thermostatic means in said opening to be responsive to the temperature of the water therein coming from said heater, said thermostatic means being connected to said closure means to move the closure means in the direction toward said second seat to restrict the flow of water through said second seat and to said exchanger with an increase in temperature of the water in said opening.

2. In an apparatus as set forth in claim 1, including means operatively associated with that portion of the exchanger comprising the domestic water heating system and responsive to the flow of water therethrough from said supply and operatively connected to said closure means to move said closure means towards said first seat and away from said second seat in response to said flow of water from said supply to thereby reduce the flow of water from said heater to said element and increase the flow of water from said heater to said exchanger.

3. In an apparatus as set forth in claim 1 wherein said seats are opposite each other with a portion of said opening therebetween, said heater connection communicating with said portion of said opening, said closure means being positioned in said portion of said opening.

4. In an apparatus as set forth in claim 3, wherein said closure means and said thermostatic means are unitary, said closure means being normally positioned in juxtaposition to said first seat to obstruct the flow of heated water therethrough, said apparatus including:
a switching device operatively associated with that portion of the exchanger comprising the domestic water heating system and responsive to the flow of water therethrough from said supply; and
power operating means operatively connected to said closure means to move said closure means away from said first seat when flow of heated water from said heater to said element is demanded, said operating means being connected to said switching device to maintain the closure means in juxtaposition to said first seat when said switching device responds to the flow of water in said system and to override said demand and return said closure means in juxtaposition to said first seat when said switching device so responds.

5. In an apparatus as set forth in claim 3, wherein said thermostatic means moves said closure means away from said first seat as well as toward said second seat with an increase in temperature of the water in said opening, said apparatus including priority means operatively associated with that portion of the exchanger comprising the domestic water system and responsive to the flow of water therethrough from said supply, said priority means being operatively associated with said thermostatic means to move said closure means toward said first seat and away from said second seat when said priority means responds to said flow of water from said supply.

6. In an apparatus as set forth in claim 5, wherein said thermostatic means includes a heat sensor, said priority means includes a conduit between said supply and said exchanger to conduct cold water from said supply to said exchanger, said conduit forming a loop about the sensor in heat exchange relationship therewith to an extent greater than the influence of the water in the valve body on the sensor.

References Cited

UNITED STATES PATENTS

| | | | |
|---|---|---|---|
| 2,081,831 | 5/1937 | Moore | 237—8 |
| 2,322,872 | 6/1943 | Moore | 237—8 |
| 2,596,812 | 5/1952 | Carson | 236—18 |
| 2,776,796 | 1/1957 | Mosley | 236—1 |
| 3,133,590 | 5/1964 | Lowe | 236—18 X |

EDWARD J. MICHAEL, *Primary Examiner.*

U. S. Cl. X.R.

236—23

UNITED STATES PATENT OFFICE
CERTIFICATE OF CORRECTION

Patent No. 3,426,971                                                    February 11, 1969

Hans Meier

It is certified that error appears in the above identified patent and that said Letters Patent are hereby corrected as shown below:

Column 1, line 20, after "other" insert -- about --; line 56, after "heating" insert -- connected --. Column 2, line 4, "attached" should read -- attained --; line 6, after "circulation" insert -- heating --; line 46, after "domestic" insert -- water --. Column 3, line 38, "through", first occurrence, should read -- via --; line 40, "via" should read -- through --.

Signed and sealed this 7th day of April 1970.

(SEAL)
Attest:

Edward M. Fletcher, Jr.                            WILLIAM E. SCHUYLER, JR.
Attesting Officer                                             Commissioner of Patents